(No Model.)

E. HÄNISCH & M. SCHROEDER.
PROCESS OF PRODUCING SULPHURIC ANHYDRIDE.

No. 384,841. Patented June 19, 1888.

WITNESSES:
Henry Huber.
Carl Katz.

INVENTORS.
Emil Hänisch and
Max Schroeder.
BY
Goepel & Raegener
ATTORNEYS.

N. PETERS. Photo-Lithographer, Washington, D. C.

UNITED STATES PATENT OFFICE.

EMIL HÄNISCH AND MAX SCHROEDER, OF HAMBORN, PRUSSIA, GERMANY.

PROCESS OF PRODUCING SULPHURIC ANHYDRIDE.

SPECIFICATION forming part of Letters Patent No. 384,841, dated June 19, 1888.

Application filed March 31, 1888. Serial No. 269,167. (No specimens.) Patented in Germany February 1, 1887, No. 42,215, and in England June 28, 1887, No. 9,188.

*To all whom it may concern:*

Be it known that we, EMIL HÄNISCH and MAX SCHROEDER, of Hamborn, in the Kingdom of Prussia, Empire of Germany, have invented certain new and useful Improvements in Processes of Producing Sulphuric Anhydride, (for which Letters Patent have heretofore been granted to us by the government of Germany, No. 42,215, dated February 1, 1887, and by the government of England, dated June 28, 1887, No. 9,188,) of which the following is a specification.

This invention relates to an improved process of producing sulphuric anhydride from a gaseous mixture of sulphurous acid and oxygen by conducting said gaseous mixture over spongy platinum or other efficacious contact substances heated to a low red heat. For obtaining a better result the platinum has been transferred to asbestus or other suitable substance, which presents a large surface for the purpose of insuring during the passage of the gases the extended contact of the same with the platinum.

Besides enlarging the contact-surface of the platinum, the invention is designed to prolong the duration of contact of the gaseous mixture of sulphurous acid and oxygen by diminishing considerably the volume of the gases by subjecting them to pressure before passing them over the heated platinum contact-surface. If, for example, a pressure of three atmospheres be employed, the gas-mixture will be compressed to one-third of its original volume, and may remain, therefore, in the space charged with the incandescent substance three times as long as when its passage takes place under ordinary atmospheric pressure. Furthermore, the chemical process is better performed under a higher pressure, as the chemically-active gas molecules are brought closer together.

Our invention consists, therefore, in a process of producing sulphuric anhydride by compressing sulphurous acid and oxygen preparatory to bringing the mixture in contact with the incandescent surface, and then subjecting the mixture at the same pressure to the converting action of a contact-surface at red heat.

Figure 1:
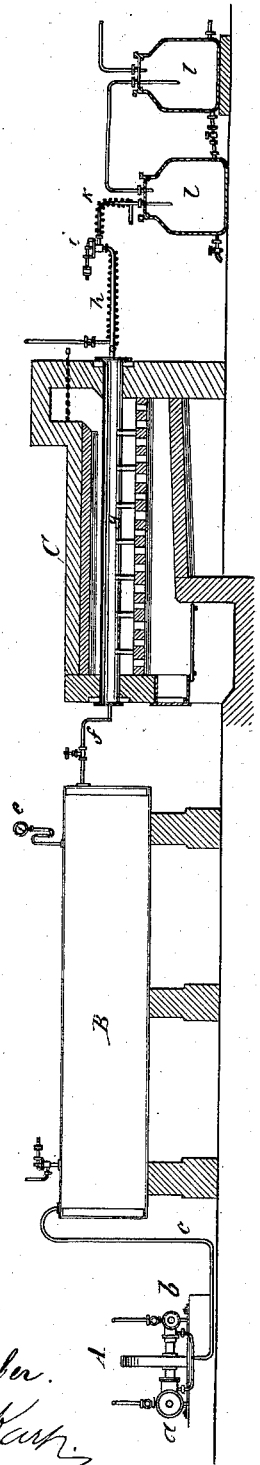
Figure 2:
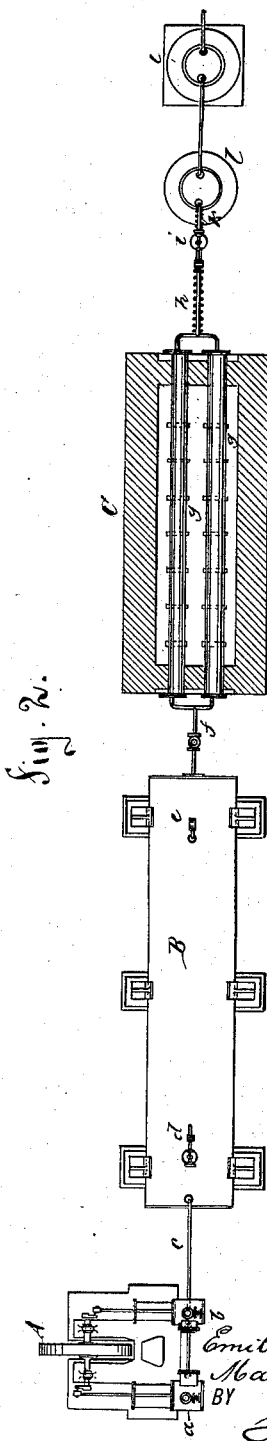

In the accompanying drawings, Figure 1 represents a sectional side elevation of one form of apparatus which may be employed for carrying out our improved process of producing sulphuric anhydride; and Fig. 2 is a plan of the same, partly in horizontal section.

Similar letters of reference indicate corresponding parts.

The gas-mixture to be used for our process may be obtained in the required composition, either by the decomposition of concentrated sulphuric acid or sulphates at a high temperature, which contain sulphurous acid and oxygen in the proportions most favorable for our process, or it may be necessary to first prepare the mixture in the proper proportions by generating sulphurous acid and oxygen separately and mixing them, or by using in place of oxygen atmospheric air. As the latter method offers—by reason of the difficulties presented in the decomposition of the sulphuric acid at a high temperature and the high cost of the pure oxygen—greater commercial advantages, the apparatus necessary for the purpose is shown as designed for such a method. It is first requisite that the pure sulphurous acid to be used shall be always mixed with atmospheric air in the proper proportion, and so that no considerable fluctuations occur in the composition of the mixture. For this method the most favorable proportions are 29.6 volumes of sulphurous acid to 70.4 volumes of atmospheric air, (with 14.8 volumes of oxygen;) but as small fluctuations in the composition of the mixture cannot in practice be avoided, it is preferable to take a slight excess of air in order that loss in the valuable sulphurous acid may as far as possible be prevented. On these grounds it is advisable to employ a mixture of about twenty-five per cent. $SO_2$ and seventy-five per cent. air. The proper mixing of the sulphurous acid with the air simultaneously with the compression of gases is effected by a double-cylinder compressor and mixing-machine, A, the two cylinders $a$ and $b$ being relatively of such dimensions that the air suction-cylinder $a$ has three times the cross-sectional area of the sulphurous-acid suction-cylinder $b$, with same length of stroke, so that when the compressor is working three times as much air as sulphurous acid will be supplied. The compressed gases of both cylinders unite in the pressure-tube $c$, through which they pass to the compressing-vessel B, provided with a safety-valve, d, and manometer e. Thence the mixed gases under a high pressure pass through a valve and tube, f, to the combining-furnace C. It has, as shown in the drawings, two wrought-iron pipes, g, heated to red heat and charged with the platinized contact substance, through which the gases under pressure simultaneously pass. The pipes g are of comparatively small diameter and very strong, so that when at a low red heat they may be capable of withstanding the pressure of several atmospheres. After passing through the pipes g, in which the greater part of the gases are converted into anhydride, they again come together in the tube h and pass to the outlet-valve i, which is so adjusted that at the working pressure—generally from two to three atmospheres—they are equably discharged into the tube k.

In order that the formed anhydride may not settle in the tubes h and k or in the outlet-valve i, and so give rise to stoppages, they are encircled with a lead worm supplied with steam, so that the temperature is maintained above the volatilizing-point of the anhydride. Should, however, from accidental causes, these pipes become stopped or the outlet-valve stick, the pressure would rise in the vessel B and the safety-valve d be set in action. This valve is adjusted to discharge at one atmosphere of pressure above that employed in the normal course of the process.

The gases present after the conversion, mainly composed of nitrogen and sulphuric anhydride, are passed through earthenware condensing-vessels l, serving to separate the anhydride, or for dissolving the same in ordinary sulphuric acid. The small quantity of sulphurous acid present after separating the anhydride in the remaining gases is utilized in the usual way as battery-cell acid, or, after eliminating the nitrogen, used over again in the anhydride process.

Having now particularly described and ascertained the nature of our said invention and in what manner the same is to be performed, we declare that what we claim is—

The process herein described of producing sulphuric anhydride, which consists in reducing the volume of a gaseous mixture of sulphurous acid and oxygen by compression, and subjecting this mixture under pressure to the converting action of a suitable contact-surface at red heat, substantially as set forth.

In testimony that we claim the foregoing as our invention we have signed our names in presence of two subscribing witnesses.

EMIL HÄNISCH.
MAX SCHROEDER.

Witnesses:
J. F. MONAGHAN,
H. E. HAMMOND.